(12) United States Patent
Lee

(10) Patent No.: US 6,390,246 B1
(45) Date of Patent: May 21, 2002

(54) DISC BRAKE ATTACHING MECHANISM FOR CYCLES

(76) Inventor: Mu Kai Lee, No. 14, Lane 69, Sec. 4, Tien Gin Road, Taichung (TW), 406

( * ) Notice: Subject to any disclaimer, the term of this patent is extended or adjusted under 35 U.S.C. 154(b) by 0 days.

(21) Appl. No.: 09/797,071

(22) Filed: Feb. 27, 2001

(51) Int. Cl.7 .............................................. F16D 55/00
(52) U.S. Cl. .................................. 188/71.1; 188/24.12
(58) Field of Search ................................ 188/71.7, 71.1, 188/24.11, 24.12, 24.19, 24.22, 26, 72.4, 196 M, 218 L, 344, 73.1, 73.43, 73.44, 73.46

(56) References Cited

U.S. PATENT DOCUMENTS 3,765,511 A * 10/1973 Toyomasu ................... 188/26
4,022,297 A * 5/1977 Haraikawa ................... 188/26
4,215,768 A * 8/1980 Seki ........................... 188/73.3
4,360,082 A * 11/1982 Haraikawa et al. ...... 188/73.45
6,230,849 B1 * 5/2001 Lumpkin ................. 188/24.12

* cited by examiner

Primary Examiner—Pam Rodriguez

(57) ABSTRACT

A disc brake attaching mechanism includes a shaft and a brake disc secured to a cycle, a brake device, a ball engaged on the shaft and rotatably received in the brake device, and a fastener for adjustably securing the ball in the brake device. The ball and the shaft may be adjusted relative to the cycle before the ball is solidly secured to the cycle. The ball has a slit for allowing the shafts of different outer diameter to be engaged into the ball. A pin may be engaged into the slit of the ball for limiting a rotational movement of the ball relative to the brake device.

6 Claims, 4 Drawing Sheets

DISC BRAKE ATTACHING MECHANISM FOR CYCLES

BACKGROUND OF THE INVENTION

1. Field of the Invention

The present invention relates to a brake device, and more particularly to a disc brake attaching mechanism for attaching or securing to the cycles.

2. Description of the Prior Art

Typical disc brake devices for cycles are solidly secured or attached onto the cycles, and may not be adjusted relative to the cycles, such that the brake shoes of the brake devices may not be suitably adjusted relative to the brake discs and thus may not be used to effectively engage with and to brake the brake discs.

The present invention has arisen to mitigate and/or obviate the afore-described disadvantages of the conventional disc brake attaching mechanisms for cycles.

SUMMARY OF THE INVENTION

The primary objective of the present invention is to provide a disc brake attaching mechanism for adjustably securing or attaching the disc brake device to the cycles and for allowing the brake shoes to be effectively engaged with the brake discs.

In accordance with one aspect of the invention, there is provided a disc brake attaching mechanism for a cycle, the disc brake attaching mechanism comprising a shaft for attaching to the cycle, a brake disc for attaching to the cycle, a brake device body, and means for adjustably securing the brake device body to the shaft.

The adjustably securing means- includes a ball engaged on the shaft and rotatably received in the brake device body, and means for fastening the ball in the brake device body.

The brake device body includes a chamber formed therein for receiving the ball and includes an aperture formed therein for receiving the shaft.

The ball includes a slit formed therein, the adjustably securing means includes a pin engaged into the chamber of the brake device body and engaged into the slit of the ball for limiting a rotational movement of the ball relative to the brake device body. The formation of the provision of the slit in the ball allows the shafts of different outer diameters to be engaged into the ball.

The brake device body includes an aperture formed therein and communicating with the chamber thereof, the adjustably securing means includes a fastener threaded into the aperture of the brake device body and engaged with the ball for securing the ball to the brake device body.

The brake device body includes an inner thread formed in the aperture thereof, the fastener is threaded with the inner thread of the brake device body and includes an engaging hole formed therein for receiving a driving tool.

A pad is further provided and received in the aperture of the brake device body and engaged between the ball and the fastener, the pad includes a curved depression formed therein for snugly receiving the ball.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
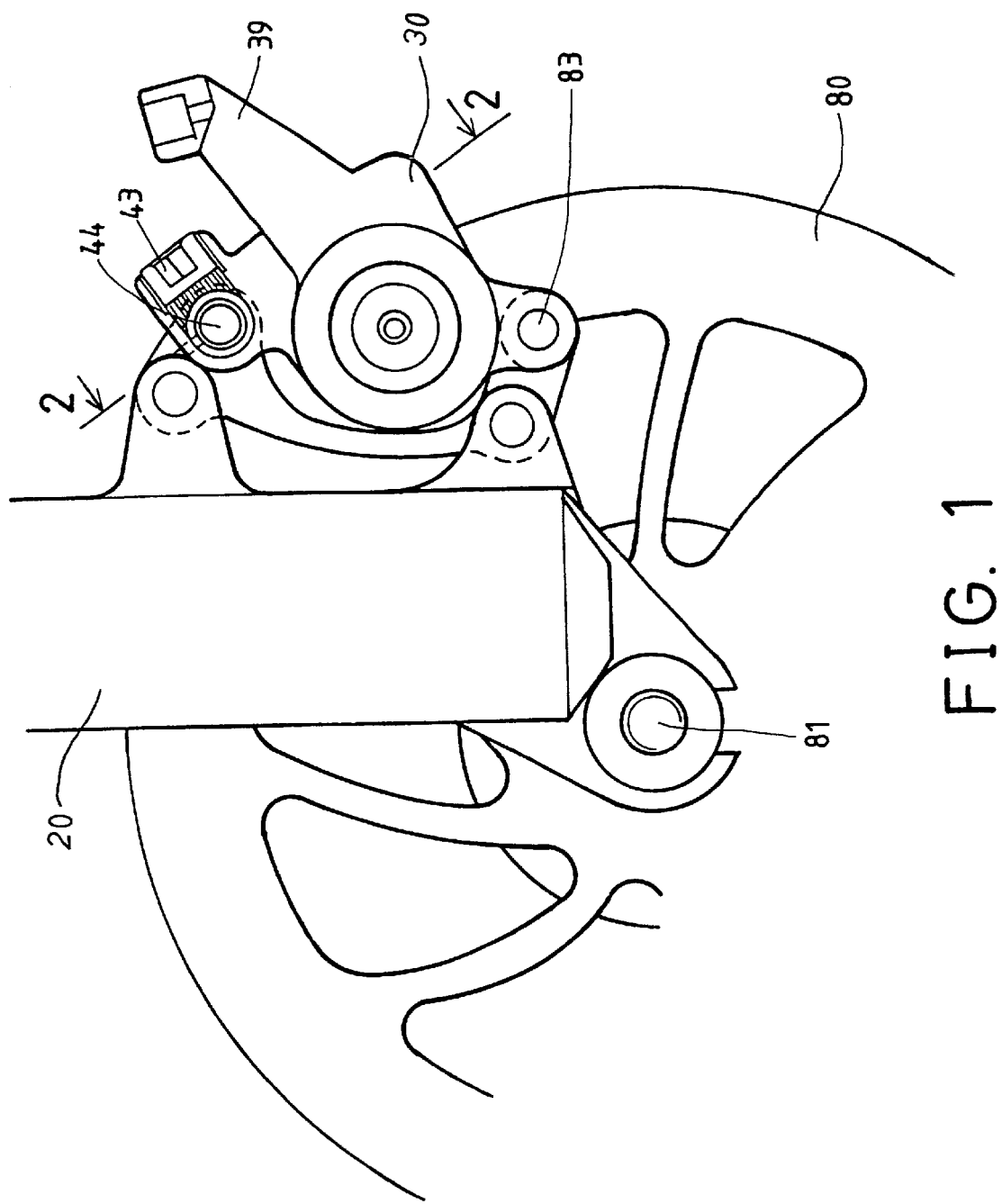
FIG. 1 is a plane view illustrating the attachment or the securing of a disc brake attaching mechanism in accordance with the present invention to a cycle.
Figure 2:
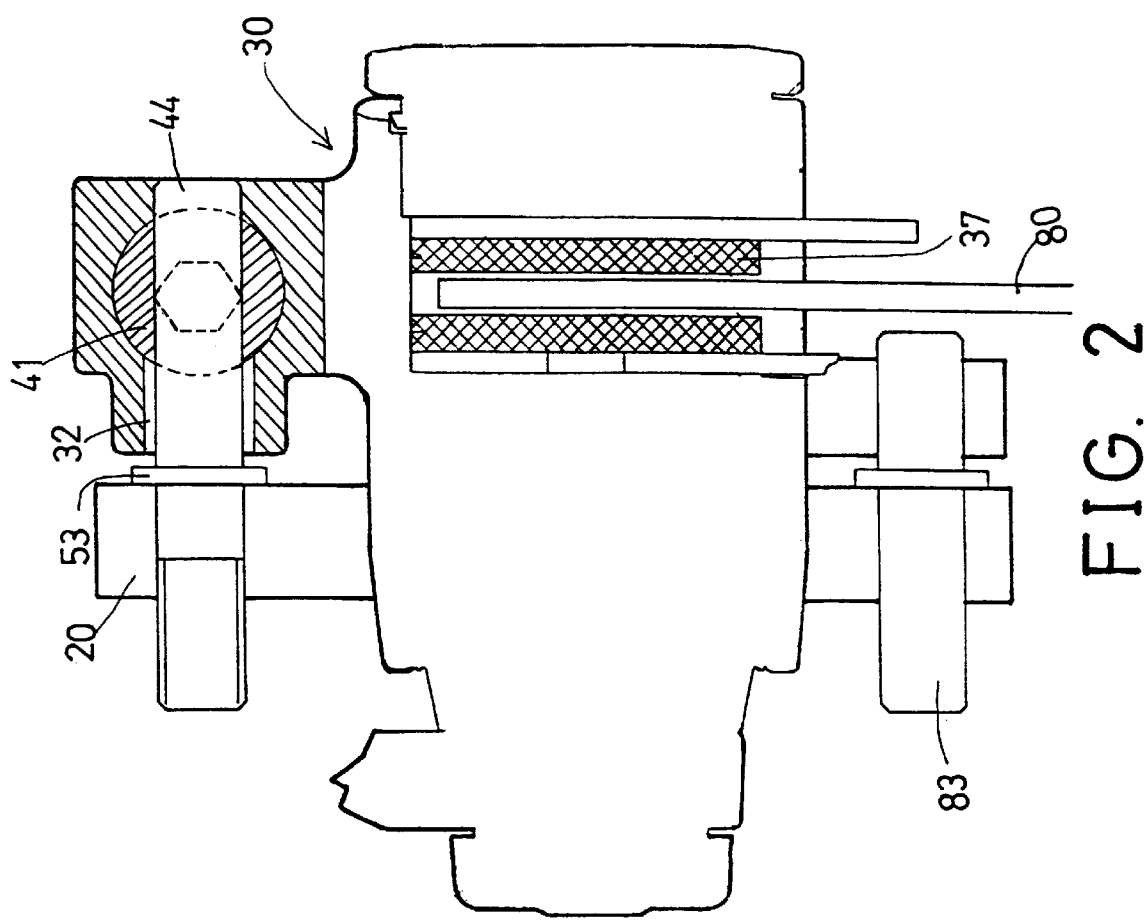
FIG. 2 is a partial cross sectional view taken along lines 2—2 of FIG. 1.
Figures 3, 4:
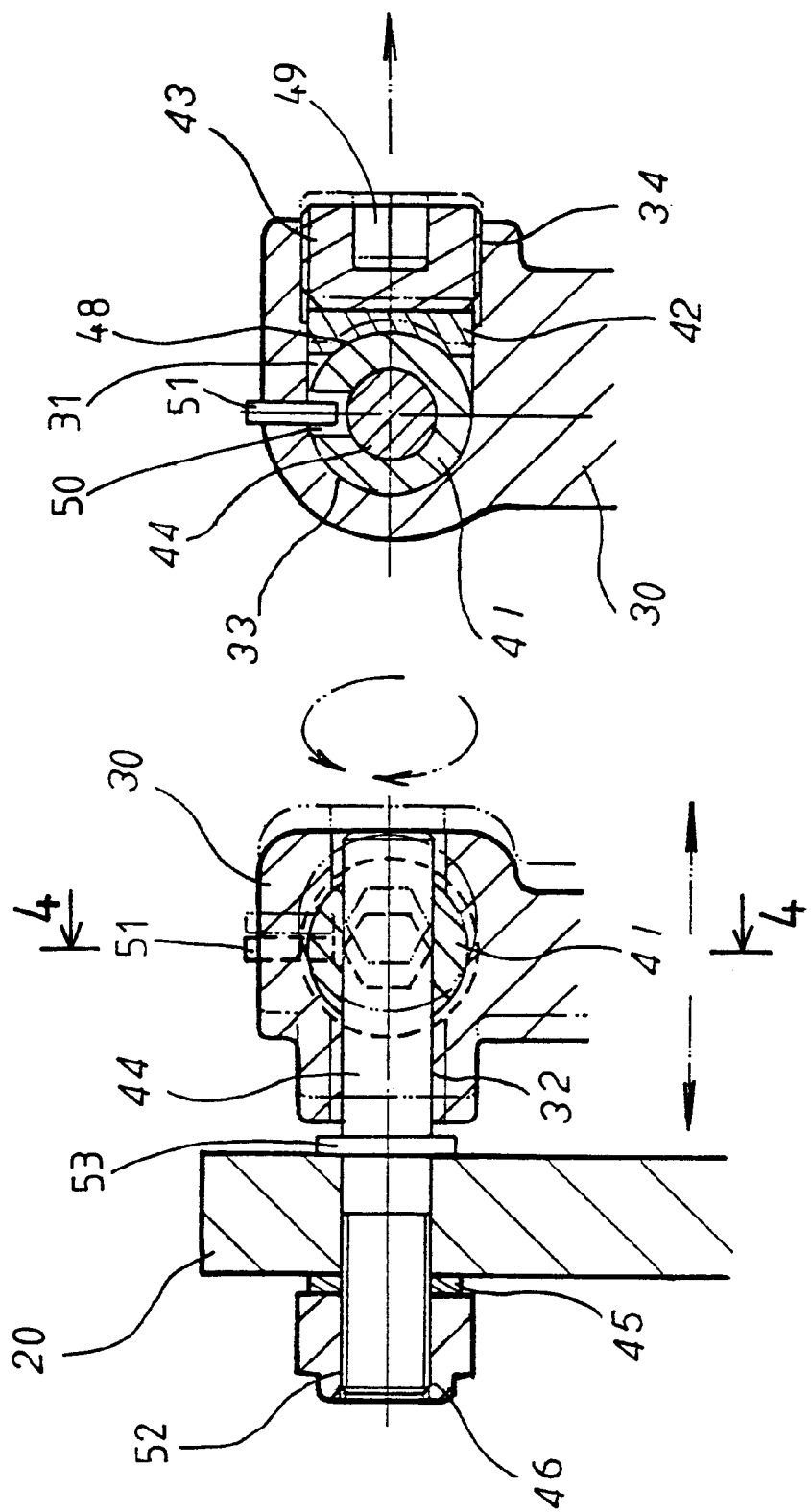
FIG. 3 is a partial cross sectional view of that shown in FIG. 2, illustrating the adjusting operation of the disc brake attaching mechanism.
FIG. 4 is a partial cross sectional view taken along lines 4—4 of FIG. 3.
Figure 5:
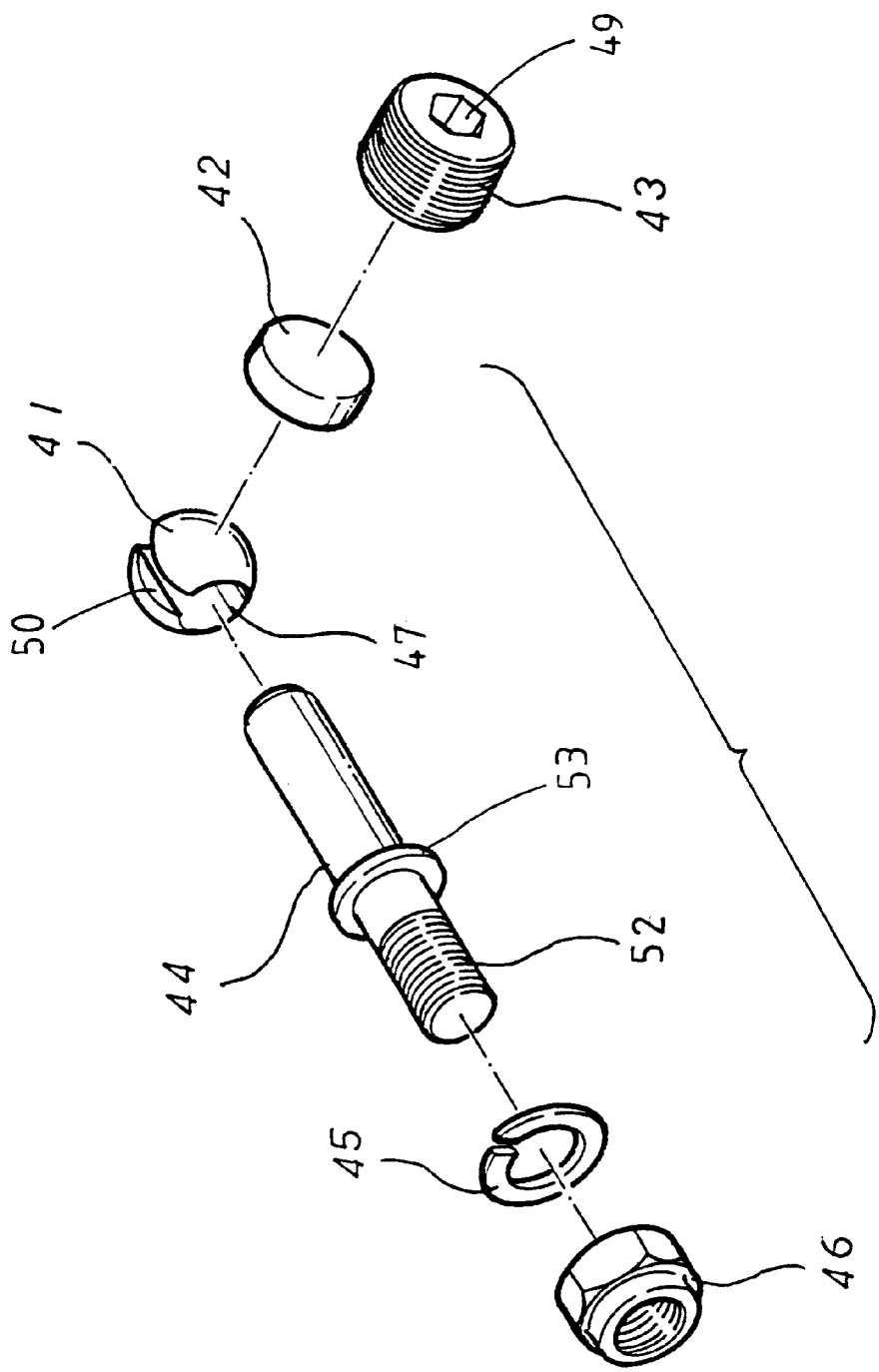
FIG. 5 is a partial exploded view illustrating the elements of the disc brake attaching mechanism.

Referring to the drawings, and initially to FIGS. 1–3, a disc brake attaching mechanism in accordance with the present invention is provided for attaching or securing a brake device (30), such as a disc brake device 30 to a cycle (20), particularly to the fork device 20 of the cycle. The disc brake device 30 comprises a brake disc 80 solidly secured to the cycles, particularly secured to the wheel axle 81 (FIG. 1) of the cycles. The disc brake device 30 includes a body to be attached to the cycle with one or more shafts 44 and/or fasteners 83, and includes one or more brake shoes 37 (FIG. 2) for engaging with and for braking the brake disc 80, and includes an arm 39 (FIG. 1) for coupling to a brake lever with a brake cable (not shown) or the like.

Referring next to FIGS. 2–5, the shaft 44 includes a peripheral flange 53 radially extended outward therefrom for engaging with the fork device 20 of the cycle, and includes an outer thread 52, formed on one end thereof. A washer 45 is engaged onto the other end of the shaft 44, and a lock nut 46 is threaded onto the outer thread 52 of the shaft 44 for solidly securing the shaft 44 to the fork device 20 of the cycle. The body 30 of the disc brake device includes an aperture 32 formed therein, best shown in FIGS. 2, 3, and having an inner diameter greater than that of the shaft 44 for loosely receiving the shaft 44, and includes a passage 31 formed therein and intersecting or communicating with the aperture 32 of the body 30 for forming a chamber 33 in the intersecting portion of the aperture 32 and the passage 31 of the body 30.

A ball 41 is rotatably received in the chamber 33 of the body 30 and includes an orifice 47 formed therein for receiving the shaft 44, and includes a slit 50 formed therein and preferably parallel to the orifice 47 of the ball 41 and communicating with the orifice 47 of the ball 41, for allowing the shaft 44 to be easily engaged into the orifice 47 of the ball 41. The formation or the provision of the slit 50 in the ball 41 allows the inner diameter of the orifice 47 of the ball 41 to be adjusted and allows the shafts 44 of different outer diameter to be engaged into the orifice 47 of the ball 41. A washer or a pad 42 is engaged into the passage 31 of the body 30 and includes a curved depression 48 (FIG. 4) formed therein for smoothly and snugly receiving the ball 41. A fastener 43 is threaded to an inner thread 34 (FIG. 4) that is formed in the end portion of the passage 31 of the body 30 for securing the ball 41 in the body 30. The fastener 43 includes an engaging hole 49 formed therein for receiving a driving tool which may rotate and drive the fastener 43 into the passage 31 of the body 30.

As shown in FIGS. 3 and 4, a lock pin 51 is secured to the body 30 and is engaged into the chamber 33 of the body 30 and engaged into the slit 50 of the ball 41 for centering the ball 41 and for limiting the rotational movement of the ball 41 relative to the body 30.

In operation, as shown in FIG. 2, the body of the disc brake device 30 may first be secured to the fork device 20 with the other fasteners 83. The shaft 44 may then be engaged through the orifice 47 of the ball 41 and secured to the fork device 20. At this moment, the shaft 44 is loosely received in the aperture 32 of the body 30 and the ball 41 may be rotated relative to the body 30 such that the shaft 44 and the ball 41 may be suitably adjusted relative to the body 30. The fastener 43 may then be threaded to the body 30 for solidly securing the ball 41 in the body 30 and for solidly securing the shaft 44 to the body 30.

It is to be noted that the formation or the provision of the slit 50 in the ball 41 allows the ball 41 to be solidly forced to engage with the shaft 44 and to solidly secure the ball 41 to the shaft 44 by the fastener 43. The disc brake device 30 may thus be adjustably and solidly secured to the fork device 20 of the cycles by the rotational engagement of the ball 41 in the body 30 and by the loosely engagement of the shaft 44 in the aperture 32 of the body 30. The body of the disc brake device 30 may be adjustably secured to the cycle with one or more shafts 44.

Accordingly, the disc brake attaching mechanism in accordance with the present invention may be used for adjustably securing or attaching the disc brake device to the cycles and for allowing the brake shoes to be effectively engaged with the brake discs.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A disc brake attaching mechanism for a cycle, said disc brake attaching mechanism comprising:

a shaft for attaching to the cycle, a brake disc for attaching to the cycle, a brake device body, and means for adjustably securing said brake device body to said shaft, said adjustable securing means including a ball engaged on said shaft and rotatably received in said brake device body, and means for fastening said ball in said brake device body.

2. The disc brake attaching mechanism according to claim 1, wherein said brake device body includes a chamber formed therein for receiving said ball and includes an aperture formed therein for receiving said shaft.

3. The disc brake attaching mechanism according to claim 2, wherein said ball includes a slit formed therein, said adjustable securing means further includes a pin engaged into said chamber of said brake device body and engaged into said slit of said ball for limiting a rotational movement of said ball relative to said brake device body.

4. The disc brake attaching mechanism according to claim 2, wherein said brake device body includes an aperture formed therein and communicating with said chamber thereof, said adjustable securing means further includes a fastener threaded into said aperture of said brake device body and engaged with said ball for securing said ball to said brake device body.

5. The disc brake attaching mechanism according to claim 4, wherein said brake device body includes an inner thread formed in said aperture thereof, said fastener is threaded with said inner thread of said brake device body and includes an engaging hole formed therein for receiving a driving tool.

6. The disc brake attaching mechanism according to claim 4 further comprising a pad received in said aperture of said brake device body and engaged between said ball and said fastener, said pad including a curved depression formed therein for snugly receiving said ball.

\* \* \* \* \*